United States Patent [19]

Herz et al.

[11] Patent Number: 4,531,181
[45] Date of Patent: Jul. 23, 1985

[54] HIGH VOLTAGE POWER SUPPLY

[75] Inventors: Harold L. Herz, Binghamton; Sam S. Jobes, Vestal, both of N.Y.; John D. Jordan, Chesapeake, Va.; David P. Benfey, Endicott; William C. Wheeler, Conklin, both of N.Y.

[73] Assignee: General Electric Company, Binghamton, N.Y.

[21] Appl. No.: 452,113

[22] Filed: Dec. 22, 1982

[51] Int. Cl.³ .......................... H02M 3/335
[52] U.S. Cl. .................................. 363/21
[58] Field of Search ..................... 363/15, 20, 21

[56] References Cited

U.S. PATENT DOCUMENTS

| | | | |
|---|---|---|---|
| 3,562,623 | 2/1971 | Farnsworth | 363/20 |
| 3,742,330 | 6/1973 | Hodges et al. | 321/9 A |
| 3,818,306 | 6/1974 | Marini | 321/2 |
| 3,840,797 | 10/1974 | Aggen et al. | 321/2 |
| 3,909,702 | 9/1975 | Hart | 323/17 |
| 3,967,181 | 6/1976 | Chambers et al. | 321/2 |
| 4,188,568 | 2/1980 | Manners | 315/411 |
| 4,298,835 | 11/1981 | Rowe | 323/281 |
| 4,302,802 | 11/1981 | Hyde et al. | 363/21 |
| 4,302,803 | 11/1981 | Shelly | 363/20 |
| 4,307,440 | 12/1981 | Inoue et al. | 363/15 |
| 4,321,514 | 3/1982 | Thibodeau et al. | 315/411 |
| 4,335,335 | 6/1982 | Willis | 315/411 |

Primary Examiner—Peter S. Wong
Assistant Examiner—Anita M. Ault
Attorney, Agent, or Firm—I. David Blumenfeld

[57] ABSTRACT

A high voltage power supply of the flyback type typically used in cathode ray tube displays or TV receivers operates in synchronism with the scan rate frequency of display and may either be self-synchronizing, externally synchronized, or externally directly driven. The power supply has a relatively high efficiency (75%), regulates three output voltages to within ±0.1% against source voltage variations and regulates its highest level voltage output to within ±0.1% against source voltage and load variations.

7 Claims, 1 Drawing Figure

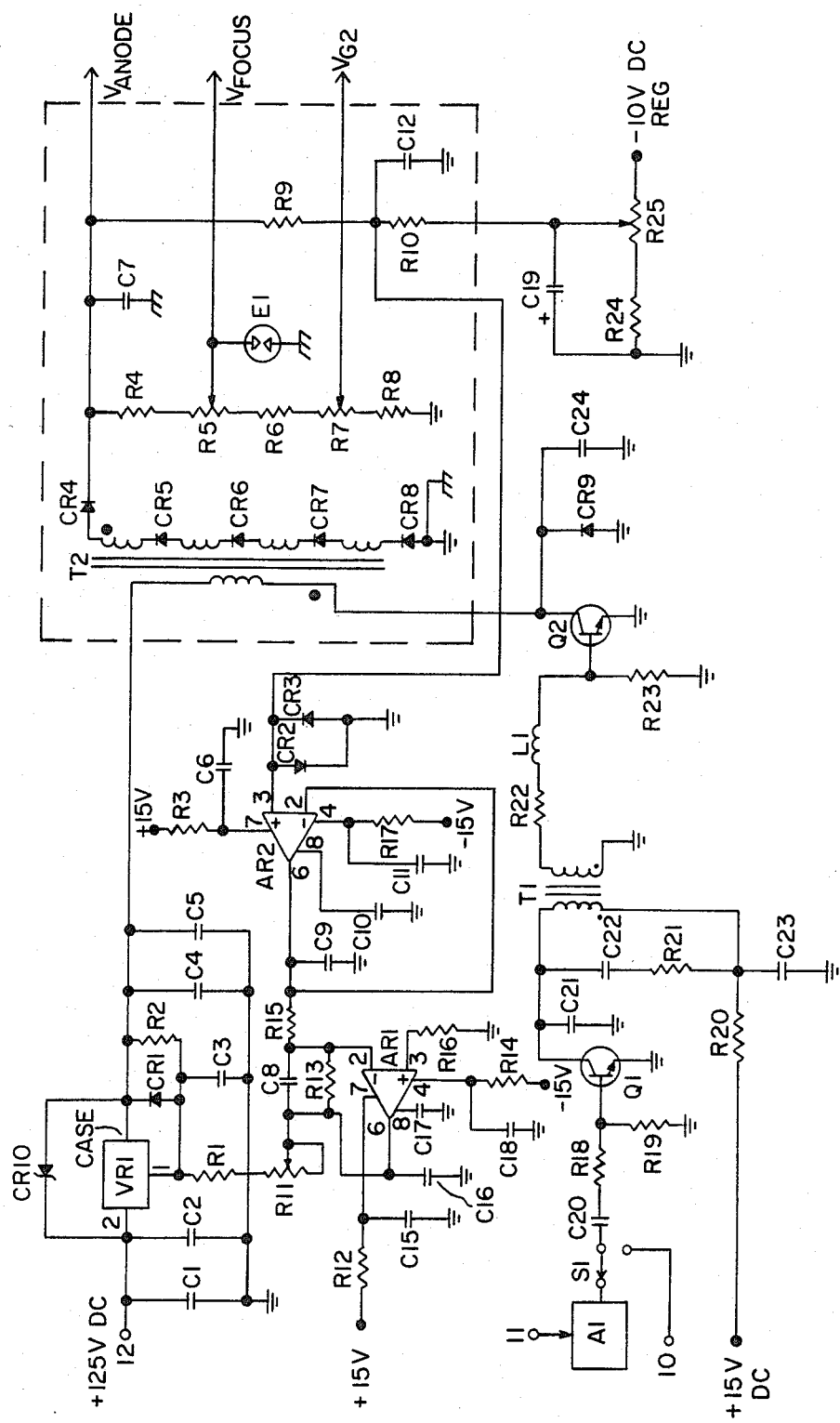

HIGH VOLTAGE POWER SUPPLY

BACKGROUND OF THE INVENTION

1. Field of the Invention

This invention relates to high voltage power supplies, and more particularly to a regulated high voltage power supply of the type including a flyback transformer suitable for providing a highly regulated anode voltage to a cathode ray tube.

2. Description of the Prior Art

In many high voltage applications, it has been found that unregulated power supplies are incapable of preventing undesired operational fluctuations in the utilization device supplied thereby. For example, in cathode ray tube displays, an increase in the brightness level produces an image distortion known as "blooming" due to increased demand on the high voltage power supply and the resultant lower output voltage thereof. To overcome this drawback, many arrangements incorporate regulating devices. However, typically such devices have the disadvantage of requiring the dissipation of equivalent energy in the regulation device when the output power demand is low. Other prior art devices utilize free-running oscillators to drive a switch transistor, and such results in random interference beat patterns in the television picture since the power supply switching frequency is non-synchronous with the TV's fast scan rate. Other prior art supplies have limited regulation capability when used with unregulated B+ input. And still others operate at lower switching frequencies which limits the usefulness to lower resolution television displays.

It is, therefore, a principal object of the present invention to overcome the disadvantages attendant in the prior art approaches and to provide an improved high voltage power supply which, inter alia, uses fast scan synchronization of the power supply switching frequency; i.e., the power supply switching rate is synchronized with the fast scan pulses rate of the CRT. In the preferred mode, the power supply switching is synchronized with the CRT fast scan frequency. As pointed out previously, by synchronizing the switching rate to the CRT scan rate, random interference, beat patterns on the CRT display are avoided. By synchronizing regulator switching the effect of any switching transients on the CRT display are minimized. In addition, the power supply regulates the output by feedback to a device which regulates the B+ input.

SUMMARY OF THE INVENTION

The above and other objects of the present invention are accomplished by providing a regulated high voltage power supply which includes means for receiving an input voltage as well as a flyback power transformer having a primary winding and a single secondary output winding, the primary winding receiving the input voltage, the output winding providing a regulated output high voltage for driving a load. Also included are means for providing excitation pulses to the primary winding for driving the transformer and means for sampling the output high voltage, as well as means for inverting and amplifying the sampled output and providing a feedback voltage signal. A series controllable voltage regulator is provided connected in circuit between the receiving means and the transformer primary winding for regulating the input voltage, the regulator further receiving the feedback voltage signal for regulating the output high voltage against variations due to the load.

BRIEF DESCRIPTION OF THE DRAWING

These and other features of the present invention will be readily apparent from the following description when taken with the accompanying drawing in which there is shown, in schematic form, the preferred embodiment of the regulated high voltage power supply of the present invention.

DESCRIPTION OF THE PREFERRED EMBODIMENT

Referring to the drawing FIGURE, there is shown the preferred embodiment of the improved high voltage power supply of the present invention. A 40% duty cycle positive pulse is fed to the base of transistor Q1 through coupling capacitor C20 and resistor R18 from either the free-running oscillator A1 or from the external drive input terminal 10 of the power supply. Where an oscillator such as A1 is used as the pulse source for switching pulses, it is preferably triggered externally from input terminal 11 to synchronize the power supply switching pulses to the CRT scan rate. As will be described subsequently, one operative embodiment of the power supply utilizes an externally triggered 26,000 Hz, 40% positive duty cycle oscillator. Thus with switch S1 positioned as shown in the sole FIGURE, the synchronized pulses from oscillator A1 drive switching transistor Q2 through Q1 and pulse transformer T1. Alternatively, switch S1 may be connected to input terminal 10 which receives switching pulses from the sweep circuit of the CRT, thereby synchronizing the triggering pulses for the power supply with the sweep frequency of the CRT. Transistor Q1 is connected as a grounded emitter amplifier with the primary of pulse transformer T1 in its collector circuit. Transistor Q1 is powered from +15 volt dc which is decoupled by resistors R20 and capacitor C23. The primary winding of transformer T1 is shunted by the series combination of resistor R21 and capacitor C22 which acts to dampen the overshoot appearing on the collector of Q1 when it turns off. The negative pulse developed on the collector of transistor Q1 and across the primary of transformer T1 is coupled to the secondary winding in the same phase where it is fed to the base of switching transistor Q2 through resistor R22 and inductor L1. Thus, when transistor Q1 turns on, transistor Q2 will turn off, and vice versa.

Switching transistor Q2 has as its collector load the primary winding of flyback power transformer T2. Transistor Q2 is powered from the regulated output of a three-terminal, controllable voltage regulator VR1, the input of which is +125 volt dc at input terminal 12. The circuit formed by transistor Q2 and the primary winding of transformer T2 operates in the conventional manner wherein a voltage proportional to the differential of a sawtooth of current flowing in the primary winding is induced in this winding. This induced or flyback voltage is stepped up in the secondary winding of transformer T2 and is rectified by diodes CR4, CR5, CR6, CR7, and CR8 and filtered by capacitor C7 to produce an output high voltage suitable for supplying a CRT anode.

The secondary winding of transformer T2 has been split into four equal sections with the diodes CR4 through CR8 connected as shown in the drawing FIGURE for the purpose of reducing stray capacitance between the secondary winding and ground, as well as to reduce capacitance between the windings as reflected into the primary winding. The net result is that we are able to tune the secondary of transformer T2 to a higher order harmonic of the primary flyback pulse fundamental frequency and thus achieve an improved regulation characteristic for the flyback circuit.

Diode CR9 is the conventional damper diode for this type of circuit and capacitor C24 tunes the primary winding to the fundamental flyback pulse.

The anode voltage developed across high voltage filter capacitor C7 feeds two resistor networks. The first, consisting of resistors R4, R5, R6, R7 and R8, provides adjustable voltage sources for the cathode ray tube focus electrode and the G2 electrode. A spark gap E1 is connected to the focus voltage output and serves to protect the electronic circuitry in case of an arc within the CRT.

The second resistor network, connected to the anode voltage bus, consists of resistors R9 and R10 and serves as a voltage divider for sampling the output high voltage for feedback purposes in controlling the total power supply regulation. The junction of resistors R9 and R10 provides a sampling of the output voltage which is compared to a preset reference voltage developed at the wiper of a high voltage adjustable potentiometer R25 from a $-10$ volt dc regulated input. Any change in the sampled voltage with respect to the preset reference voltage is fed back to pin 1 of voltage regulator VR1 through voltage follower AR2 and inverting operational amplifier AR1. The output of voltage regulator VR1 supplies the dc voltage which powers switching transistor Q2 through the primary winding of T2. The output voltage level from voltage regulator VR1 is governed by the following relationship:

$$V_{out} = 1.25 \text{ V} \left[ 1 + \frac{(R11 + R1)}{R_2} \right] + V_{AR1} \text{ (pin 6)}$$

and is inherently regulated against input +125 volts dc variations appearing at terminal 12 by internal action of regulator VR1.

The feedback path from the sampled output voltage to pin 1 of the voltage regulator VR1 is negative and acts to control the regulation of the supply as will now be described. When the cathode ray tube draws additional anode current in response to an increase in brightness control setting, the dc voltage developed from the secondary winding of transformer T2 ($V_{anode}$) will momentarily decrease. Since the voltage at the junction of resistor R10 and the wiper of resistor R25 is constant (by action of $-10$ volts dc regulated input), the voltage at the junction of resistors R9 and R10 by voltage divider action will also decrease a proportionate amount. This decrease in voltage is fed to the non-inverting input pin 3 of voltage follower AR2 which in turn feeds this decrease in voltage to the inverting input pin 2 of inverting operational amplifier AR1. The output on pin 6 of AR1 then appears as an increase in voltage which is fed to pin 1 of the voltage regulator VR1. A positive-going change on this pin 1 will cause the output voltage supplied to the collector of transistor Q2, through the primary winding of transformer T2, to rise. The induced voltage in the primary winding will also increase and cause the secondary winding voltage to increase and, hence, cause the rectified output high voltage, $V_{anode}$, also to increase and compensate for the initially assumed decrease in voltage with increased cathode ray tube load. The circuit functions in a reverse manner if the cathode ray tube brightness should be lowered and the voltage, $V_{anode}$, rises.

Potentiometer R25 adjusts the amount of $-10$ volt dc reference voltage that is balanced against the sampled output voltage and, in doing so, acts as a high voltage adjustment control.

Potentiometer R5 adjusts the magnitude of the focus electrode voltage and potentiometer R7 adjusts the magnitude of the G2 electrode voltage. Potentiometer R11 adjusts the gain of voltage regulator VR1 and controls the degree of VR1 output voltage variation with $V_{anode}$ output load current variation.

Capacitors C1, C2, C3, C4 and C5 are ripple reduction filter capacitors for the +125 volt bus. Capacitor C19 is a ripple reduction filter capacitor for the $-10$ volt regulated bus. Capacitors C12, C15, C18, C6 and C11 are RF bypass capacitors for the respective circuits. Capacitors C16, C17, C9 and C10 prevent operational amplifiers AR1 and AR2 from parasitic oscillation. Capacitor C21 controls the positive voltage excursion beyond the +15 volt bus on the collector of transistor Q1. Capacitor C8 controls the response time of the regulation action of VR1. Diodes CR2 and CR3 protect operational amplifier AR2 from excessive voltage transients appearing on the feedback line from the junction of resistors R9 and R10. Zener diode CR10 serves to protect voltage regulator VR1 from transient overvoltage conditions appearing across VR1 for any reason.

The circuit of the drawing FIGURE has been built and has operated satisfactorily with components having the following values and/or designations.

| Resistors | |
|---|---|
| R1 | 18K, 1 W, ±1% |
| R2 | 243 |
| R3, R12, R14, R17 | 22, ¼ W, ±5% |
| R4 | 194 meg., 5 W, ±1% |
| R5 | 15 meg., variable, 1 W, ±10% |
| R6 | 33.2 meg., 3 W, ±1% |
| R7 | 5 meg., variable, 1 W, ±10% |
| R8 | 3.5 meg., ¼ W, ±1% |
| R9 | 500 meg., 5 W, ±1% |
| R10 | 250K, 1 W, ±1% |
| R11 | 5K, variable, ¼ W, ±10%, Type RJR24 |
| R13 | 5 meg. |
| R15, R16 | 499 |
| R18 | 150 |
| R19 | 390 |
| R20 | 510, ¼ W, ±5% |
| R21 | 1.5K, ¼ W, ±5% |
| R22 | 1.5, 2 W, ±5% |
| R23 | 68 |
| R24 | 9.1K |
| R25 | 1K variable, ¼ W, ±10%, Type RJR26 |
| Capacitors | |
| C1 | 4.0 MFD, 250 V |
| C2, C3, C4, C6, C11, C15, C18 | .01 MFD, 200 V, ±5% .01 MFD, 100 V, ±5% |
| C5 | 50 MFD, 250 V |
| C7 | 2000 pF, 18KV DC, ±20% |
| C8, C23 | 1.0, 50 V, ±5% |
| C9, C10, C16, C17 | 100 pF, 200 V, ±5% |
| C12, C20 | 0.1 MFD, 50 V, ±5% |
| C19 | 47 MFD, 35 V, ±20% |
| C21 | 470 pF, 200 V, ±5% |
| C22 | .0047 MFD, 100 V, ±5% |
| C24 | 3000 pF, 1000 V, ±10% |

-continued

| | |
|---|---|
| Diodes | |
| CR1, CR2, CR3 | 1N4148-1 |
| CR4, CR5, CR6, CR7, CR8 | REG-3LA (Rectifier Components Corp.) |
| CR9 | MR 918 (Motorola) |
| Zener Diode | |
| CR 10 | 1N5648A |
| Transistors | |
| Q1 | 2N2222A |
| Q2 | MJ12005 (Motorola) |
| Spark Gap | |
| E1 | 4.8KV (EGG Type O6P-5OL-5) |
| Operational Amplifier | |
| AR1, AR2 | HA2-2602-2 (Harris) |
| Inductor | |
| L1 | 5.6 uH (MS14046-1) |
| Pulse Transformer | |
| T1 | PE2214 (Pulse Engineering) |
| Flyback Transformer | |
| T2 | Core Material: Stackpole Type Ceramag 50-1026 "U" Primary Winding: 112 turns AWG 25 divided into 5 sections Secondary Winding: 2340 turns AWG 40 divided into 4 sections |
| Voltage Regulator | |
| VR1 | LM117K (National Semiconductor) |

Note: All resistors RNC55H Metal Film, 1/10 watt, ±1% unless otherwise indicated.

The regulated high voltage supply of the preferred embodiment is capable of supplying the following regulated voltages within ±0.1% for driving a cathode ray tube:

Anode = +18000 volts at 1.0 ma
Focus = adjustable +3.1 KV to +3.9 KV at 30 μA
G2 = adjustable +230 V to +570 V at 10 μA The power supply operates from the following input dc voltages:
+125 V±3%
+15 V±2%
−15 V±2%
−10 V±0.05%

The power supply operates from either an input synchronizing or direct drive +5 V, 26,000 Hz, 40% duty cycle, positive square wave. In the former case, an externally triggerable, free-running oscillator, such as is commercially available and well known in the art, is required.

While the invention has been described in terms of a selected preferred embodiment, it should not be deemed limited thereto, since other embodiments and modifications will readily occur to those skilled in the art. It is therefore to be understood that the appended claims are intended to cover all such modifications which fall within the true spirit and scope of the invention.

We claim:

1. A regulated high voltage power supply comprising:

means for receiving an input voltage;

A flyback power transformer having a primary winding and a single secondary output winding, the primary winding receiving the input voltage, the output winding providing an output high voltage for driving a load;

means for providing excitation pulses to the primary winding for driving the transformer;

means for sampling the output high voltage;

means for inverting and amplifying the sampled output and providing a feedback voltage signal; and a series controllable voltage regulator connected in circuit between the receiving means and the transformer primary winding for regulating the input voltage, the regulator further receiving the feedback voltage signal for regulating the output high voltage against variations due to the load;

means for providing a second output voltage derived from the output high voltage and means for adjusting the level of the second output voltage.

2. The invention of claim 1 wherein means are provided for adjusting, individually, the levels of the at least two additional output voltages.

3. A regulated, high voltage, switching power supply, switched synchronously with the scanning rate of a fast scan cathode ray tube to avoid random, interfering beat patterns in a CRT display driven by said power supply, comprising:

(a) means for receiving a DC input voltage;

(b) a fly-back, transformer having a primary winding and a secondary, high voltage, output winding, including means for coupling the DC input voltage to the primary winding;

(c) switching means connected in series with said primary winding;

(d) means for providing switching pulses to said switching means;

(e) the pulse rate of said switching pulses being synchronized with the scan rate of the cathode ray display being driven by said power supply;

(f) a voltage regulator means connected between the intput voltage and the primary winding;

(g) a feedback path from the high voltage secondary winding side to said voltage regulator for regulating the output high voltage against variations due to the load.

4. The invention according to claim 3 wherein the means for providing switching pulses includes an oscillator synchronized at the cathode ray tube scan rate frequency.

5. The invention according to claim 4, further comprising an input terminal to said oscillator for receiving synchronizing, triggering pulses for synchronizing the oscillator to the CRT scan rate frequency.

6. The invention according to claim 4 including pulse transformer means between the source of synchronous switching pulses and the switching means in series with said primary winding.

7. The invention according to claim 4, further comprising an input terminal for receiving switching pulses synchronized at the CRT scan rate frequency.

* * * * *